United States Patent
Fleming et al.

(10) Patent No.: US 11,596,921 B2
(45) Date of Patent: Mar. 7, 2023

(54) CATIONIC COMPOSITE SILICATE FILTER AIDS

(71) Applicant: Imerys USA, Inc., Roswell, GA (US)

(72) Inventors: Robert Fleming, San Jose, CA (US); Li-Chih Hu, Sacramento, CA (US); David Gittins, San Jose, CA (US)

(73) Assignee: Imerys USA, Inc., Roswell, GA (US)

( * ) Notice: Subject to any disclaimer, the term of this patent is extended or adjusted under 35 U.S.C. 154(b) by 461 days.

(21) Appl. No.: 15/776,420

(22) PCT Filed: Nov. 18, 2016

(86) PCT No.: PCT/US2016/062836
§ 371 (c)(1),
(2) Date: May 16, 2018

(87) PCT Pub. No.: WO2017/087836
PCT Pub. Date: May 26, 2017

(65) Prior Publication Data
US 2018/0326395 A1 Nov. 15, 2018

Related U.S. Application Data

(60) Provisional application No. 62/256,963, filed on Nov. 18, 2015.

(51) Int. Cl.
*B01J 20/10* (2006.01)
*B01J 20/32* (2006.01)
(Continued)

(52) U.S. Cl.
CPC ............ *B01J 20/10* (2013.01); *B01D 15/363* (2013.01); *B01D 39/06* (2013.01); *B01D 39/14* (2013.01);
(Continued)

(58) Field of Classification Search
CPC ... B01J 20/10; B01J 20/12; B01J 20/14; B01J 20/3204; B01J 20/28004; B01J 20/28054;
(Continued)

(56) References Cited

U.S. PATENT DOCUMENTS 3,734,763 A 5/1973 Plueddemann
4,282,261 A 8/1981 Greene
(Continued)

OTHER PUBLICATIONS

European Search Report for Application No. EP 16 86 7249, dated Jun. 5, 2019.
(Continued)

*Primary Examiner* — Smita S Patel
(74) *Attorney, Agent, or Firm* — Finnegan, Henderson, Farabow, Garrett & Dunner, LLP

(57) ABSTRACT

A cationic composite filter aid may include a silicate substrate, a silica precipitated on the silicate substrate, and a cationic surface modification of the precipitated silica. A method for making a cationic composite filter aid may include providing a silicate substrate, precipitating a silica onto the silicate substrate to form a composite filter aid, and cationically modifying the precipitated silica to form a cationic composite filter aid. A method for filtering a liquid may include providing a liquid for filtering and filtering the liquid through a cationically modified composite filter aid. The cationically modified composite filter aid may include a silicate substrate, a precipitated silica, and a cationic surface modification of the precipitated silica.

6 Claims, 2 Drawing Sheets

(51) Int. Cl.
*B01D 15/36* (2006.01)
*C10G 25/02* (2006.01)
*B01D 39/06* (2006.01)
*C10G 31/09* (2006.01)
*B01D 39/14* (2006.01)
*B01D 37/02* (2006.01)

(52) U.S. Cl.
CPC ......... *B01J 20/3204* (2013.01); *B01J 20/327* (2013.01); *B01J 20/3219* (2013.01); *B01J 20/3236* (2013.01); *B01J 20/3272* (2013.01); *B01J 20/3274* (2013.01); *B01J 20/3282* (2013.01); *C10G 25/02* (2013.01); *C10G 31/09* (2013.01); *B01D 37/025* (2013.01); *B01J 20/3268* (2013.01)

(58) Field of Classification Search
CPC ................ B01J 20/041; B01J 20/28011; B01J 20/28057; B01J 20/28085; B01J 20/28042; B01J 20/16; B01J 20/3234; B01J 20/00; B01J 20/3272; B01J 20/327; B01J 20/3274; B01J 20/32404; B01J 20/382; B01J 20/3236; B01J 20/3219; B01J 20/3268; B01J 20/3282; B01D 239/04; B01D 239/06; B01D 239/14; B01D 39/04; B01D 39/06; B01D 39/14; B01D 37/025; C10G 25/02; C10G 39/09
See application file for complete search history.

(56) References Cited

U.S. PATENT DOCUMENTS

| | | | | |
|---|---|---|---|---|
| 4,981,591 | A | * | 1/1991 | Ostreicher ............. B01D 39/14 210/508 |
| 6,660,172 | B2 | * | 12/2003 | Koslow .................... B01J 20/08 210/663 |
| 6,712,974 | B1 | * | 3/2004 | Palm ...................... B01D 39/06 210/348 |
| 2004/0055957 | A1 | | 3/2004 | Palm et al. |
| 2007/0267349 | A1 | | 11/2007 | Gibson et al. |
| 2009/0274634 | A1 | | 11/2009 | Collins et al. |
| 2011/0195166 | A1 | | 8/2011 | Li et al. |
| 2012/0172195 | A1 | * | 7/2012 | Hu ....................... B01D 37/025 502/1 |
| 2012/0292250 | A1 | | 11/2012 | Lu et al. |

OTHER PUBLICATIONS

International Search Report and Written Opinion dated Jan. 30, 2017, in International Application No. PCT/US2016/062836 (15 pgs.).

\* cited by examiner

|  | None | Control | Sample Cationic Composite | | |
|---|---|---|---|---|---|
| Adsorbant (g) | 1.00 | 1.00 | 1.00 | 1.00 | 0.50 |
| Dye (mg) | 5.0 | 5.0 | 5.0 | 10.0 | 10.0 |
| Total solution (mL) | 75 | 75 | 75 | 75 | 75 |
| Dye removal (%) |  | 18 | >99 | >99 | 96 |

CATIONIC COMPOSITE SILICATE FILTER AIDS

CLAIM FOR PRIORITY

This application is a U.S. national phase entry of International Application No. PCT/US2016/062836, filed Nov. 18, 2016, which claims the benefit of priority of U.S. Provisional Application No. 62/256,963, filed Nov. 18, 2015, to both of which i application claims the benefit of priority, and the entirety of the subject matter of both of which is incorporated herein by reference.

FIELD OF THE DESCRIPTION

This disclosure relates to cationic composite filter aids, methods of making composite silicate filter aids, and methods for using cationic composite filter aids. More particularly, this disclosure relates to cationic composite filter aids that may be used in filtration applications.

BACKGROUND

Silica filter aids can be used to filter liquids. However, silica and silicate filter aids have negatively-charged surface characteristics. The negative charge may make these types of filter aids suitable for filtering positively-charged ions and molecules, but they may be poor filtration elements for negatively-charged ions and molecules. Negatively charged ions and molecules, such as arsenic, can have adverse effects or possess undesirable health properties if not properly filtered. Such particles can also lead to undesirable liquid properties, such as discoloration or oxidation.

Thus, it may be desirable to provide a filter aid composition with improved ability to remove negatively charged particles from a liquid. It may also be desirable to provide a filter aid having adsorption properties with improved filtration rates. It may also be desirable to provide a method of making a filter aid composition for filtering negatively-charged impurities.

SUMMARY

According to a first aspect of this disclosure, a cationic composite filter aid may include a silicate substrate, a silica precipitated on the silicate substrate, and a cationic surface modification of the precipitated silica.

According to another aspect, a method for making a cationic composite filter aid may include providing a silicate substrate, precipitating a silica onto the silicate substrate to form a composite filter aid, and cationically modifying the precipitated silica to form a cationic composite filter aid.

According to a further aspect, a method for filtering a liquid may include providing a liquid for filtering and filtering the liquid through a cationically modified composite filter aid. The cationically modified composite filter aid may include a silicate substrate, a precipitated silica, and a cationic surface modification of the precipitated silica.

According to still another aspect, a composite filter aid may include a diatomite substrate and a cationically modified precipitated silica gel coating.

It is to be understood that both the foregoing general description and the following detailed description are exemplary and explanatory only and are not restrictive of the invention, as claimed.

BRIEF DESCRIPTION OF THE DRAWINGS

FIG. 2 is an image showing Metanil Yellow dye adsorption of an exemplary cationic silicate filter aid.

DESCRIPTION OF EXEMPLARY EMBODIMENTS

Figure 1A:
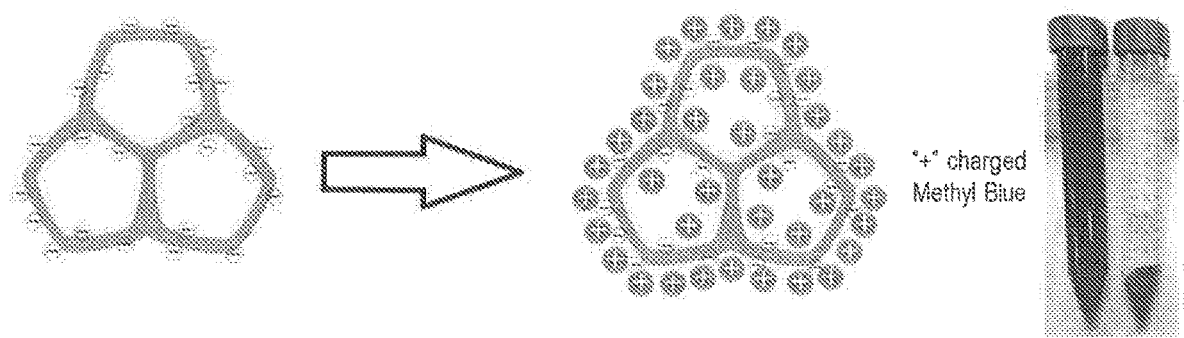
FIG. 1A shows an exemplary diagram and image of a composite silicate adsorbing positively charged Methyl Blue dye.

According to some embodiments, a cationic composite filter aid may include a silicate substrate, a silica precipitated on the silicate substrate, and a cationic surface modification of the precipitated silica.

According to some embodiments, a composite filter aid may include a diatomite substrate and a cationically modified precipitated silica gel coating.

According to some embodiments, a method for making a cationic composite filter aid may include providing a silicate substrate, precipitating a silica onto the silicate substrate to form a composite filter aid, and cationically modifying the precipitated silica to form a cationic composite filter aid.

According to some embodiments, the method may include cross-linking a cationic resin with the at least one cross-linker. The cross-linked cationic resin may include a cationic modification of the precipitated silica.

According to some embodiments, a method for filtering a liquid may include providing a liquid for filtering and filtering the liquid through a cationically modified composite filter aid. The cationically modified composite filter aid may include a silicate substrate, a precipitated silica, and a cationic surface modification of the precipitated silica.

According to some embodiments, the method may include, prior to filtering the liquid, pre-coating a filter structure with the cationically modified composite filter aid.

According to some embodiments, providing the liquid may include providing the cationically modified composite filter aid as a body feed in the liquid.

According to some embodiments, the liquid may include an aqueous liquid. According to some embodiments, the liquid may include a non-aqueous liquid. According to some embodiments, the non-aqueous liquid may include at least one of biodiesel and edible oil.

According to some embodiments, the precipitated silica may form a coating on the silicate substrate. According to some embodiments, the precipitated silica may include a silica gel. According to some embodiments, the precipitated silica may include an amorphous silica. According to some embodiments, the precipitated silica may include magnesium silicate. According to some embodiments, a precipitated magnesium silicate may be an amorphous magnesium silicate. In some embodiments, the precipitated magnesium silicate may form a magnesium silicate coating on the silicate substrate.

According to some embodiments, the silicate substrate may be selected from the group consisting of perlite, pumice, volcanic ash, calcined kaolin, smectite, mica, talc, shirasu, obsidian, pitchstone, rice hull ash, and combinations thereof. According to some embodiments, the silicate substrate may include biogenic silica. According to some embodiments, the silicate substrate may include diatomite.

According to some embodiments, the precipitated silica may be in a range from about 5% to about 80% by weight of the composite filter aid.

According to some embodiments, the cationic composite filter aid may have a permeability in a range from about 50 millidarcies ("md") to about 5000 md.

According to some embodiments, the cationic surface modification may include a cationic polymer. A cationic polymer may include, in some embodiments, a cationic resin. According to some embodiments, the cationic surface modification may include at least one coupling agent between the precipitated silica and a cationic polymer. According to some embodiments, the at least one coupling agent may include at least one functional silane, such as, for example, an amino functional silane and an isocyanate functional silane. According to some embodiments, the cationic surface modification may include at least one of a polyamine, a polyamide, a polyethyleneimine, an epoxide, polylysine, chitosan, a functional silane, a cyclic azasilane, and an amino acid. According to some embodiments, a functional silane may include an amino functional silane. According to some embodiments, an amino acid may include a protein or polypeptide. The polyamide may include polyamide epichlorohydrin. The polyamine may include polyamine epichlorohydrin. According to some embodiments, the cationic surface modification may include an amine functional molecule. According to some embodiments, the cationic surface modification may include at least one of an alkoxysilane. For example, the cationic surface modification may include a trialkoxysilane, such as, for example, aminopropyl trialkoxysilane, for example, aminopropyl triethoxysilane.

According to some embodiments, the cationic surface modification may include a cross-linked resin. According to some embodiments, a cross-linker of the cross-linked resin may include at least one of a polyamine cross-linker and an amino acid cross-linker. An amino acid may include a protein or polypeptide. According to some embodiments, a cross-linker of the cross-linked resin may include a diisocyanate, anhydride, diepoxide, or dicarboxylic add.

According to some embodiments, the cationic surface modification may include at least one titanate. According to some embodiments, the cationic surface modification may include an organo titanate.

According to some embodiments, a cationic composite filter aid having a magnesium silicate coating may have a mole ratio of $SO_2$:MgO greater than or equal to about 3.0:1. For example, the cationic composite filter aid may have a mole ratio of $SiO_2$:MgO greater than or equal to about 3.5:1, greater than or equal to about 4.0:1 greater than or equal to about 4.5:1, greater than or equal to about 5.0:1, greater than or equal to about 5.5:1, greater than or equal to about 6.0:1, greater than or equal to about 6.5:1, greater than or equal to about 7.0:1, greater than or equal to about 8.0:1, greater than or equal to about 9.0:1, greater than or equal to about 10.0:1, greater than or equal to about 13.0:1, greater than or equal to about 15.0:1, greater than or equal to about 20.0:1, greater than or equal to about 25.0:1, greater than or equal to about 30.0:1, greater than or equal to about 40.0:1, greater than or equal to about 60.0:1, greater than or equal to about 80.0:1, greater than or equal to about 100.0:1, or greater than or equal to about 120.0:1 ($SiO_2$:MgO).

According to some embodiments, the amount of precipitated silica on the silicate substrate may be in a range from about 5% to about 90% by weight of the composite filter aid, such as, for example, from about 10% to about 60%, from about 10% to about 30%, from about 20% to about 40%, from about 5% to about 15%, from about 15% to about 25%, from about 25% to about 35%, from about 20% to about 60%, from about 30% to about 50%, from about 25% to about 45%, from about 45% to about 65%, from about 25% to about 35%, from about 35% to about 45%, from about 45% to about 55%, or from about 55% to about 65% by weight of the composite filter aid.

According to some embodiments, the cationic composite filter aid may have a median particle size ($d_{50}$) in a range from about 1 to about 150 microns, such as, for example, from about 5 to about 150 microns, from about 40 to about 140 microns, from about 60 to about 120 microns, from about 30 to about 60 microns, from about 60 to about 90 microns, from about 90 to about 120 microns, from about 120 microns to about 150 microns, from about 1 to about 40 microns, from about 10 to about 40 microns, from about 10 to about 30 microns, or from about 15 to about 25 microns.

According to some embodiments, the cationic composite aid may have a $d_{90}$ in a range from about 20 to about 700 microns, such as, for example, from about 300 to about 700 microns, from about 300 to about 500 microns, from about 100 to about 300 microns, from about 200 to about 400 microns, from about 50 to about 300 microns, from about 100 to about 200 microns, from about 200 to about 300 microns, from about 20 to about 100 microns, from about 60 to about 140 microns, from about 70 to about 120 microns, or from 80 to about 110 microns.

According to some embodiments, the cationic composite filter aid may have a $d_{10}$ in a range from about 0.5 to about 30 microns, such as, for example, from about 1 to about 10 microns, from about 10 to about 20 microns, from about 20 to about 30 microns, from about 5 to about 15 microns, from about 15 to about 25 microns, from about 20 to about 25 microns, from about 2 to about 20 microns, from about 3 to about 15 microns, from about 4 to about 12 microns, from about 5 to about 10 microns, from about 1 to about 5 microns, or from about 1 to about 3 microns.

According to some embodiments, the cationic composite aid may have a permeability in a range from about 50 millidarcies ("md") to about 5000 md. For example, the cationic composite filter aid may have a permeability in a range from about from about 50 md to about 1000 md, from about 50 md to about 500 md, from about 50 md to about 300 md, from about 50 md to about 200 md, from about 50 md to about 100 mid, from about 100 md to about 400 md, from about 100 md to about 300 md, from about 100 md to about 200 md, from about 200 md to about 300 md, from about 100 md to about 4000 md, from about 100 md to about 3000 md, from about 500 md to about 3000 md, from about 500 md to about 1500 md, from about 1500 md to about 3000 md, from about 200 md to about 2000 md, from about 200 md to about 1000 md, from about 200 md to about 500 md, from about 500 md to about 1000 md, from about 1000 md to about 1500 md, from about 1500 md to about 2000 md, from about 2000 md to about 2500 md, from about 2500 md to about 3000 md, or from about 1000 md to about 2000 md.

According to some embodiments, the cationic composite filter aid may have a BET surface area in a range from about 1 $m^2$/g to about 300 $m^2$/g. For example, the cationic composite filter aid may have a BET surface area in a range from about 5 $m^2$/g to about 200 $m^2$/g, from about 50 $m^2$/g to about 250 $m^2$/g, from about 100 $m^2$/g to about 200 $m^2$/g, from about 150 $m^2$/g to about 250 $m^2$/g, from about 10 $m^2$/g to about 150 $m^2$/g, from about 30 $m^2$/g to about 150 $m^2$/g, from about 30 $m^2$/g to about 100 $m^2$/g, from about 50 $m^2$/g to about 100 $m^2$/g, from about 50 $m^2$/g to about 70 $m^2$/g, from about 60 m²/g to about 80 m²/g, from about 70 m²/g to about 90 m²/g, about 50 m²/g to about 200 m²/g, from about 50 m²/g to about 150 m²/g, from about 100 m²/g to about 200 m²/g, or from about 100 m²/g to about 150 m²/g.

According to some embodiments, the cationic composite filter aid may have a Barrett-Joyner-Halenda ("BJH") pore volume (1.7 nm-300 nm) in a range from about 0.05 cm³/g to about 1 cm³/g, such as, for example, from about 0.05 cm³/g to about 0.5 cm³/g, from about 0.10 cm³/g to about 0.20 cm³/g, from about 0.15 cm³/g to about 0.25 cm³/g, from about 0.05 cm³/g to about 0.15 cm³/g, or from about 0.10 cm³/g to about 0.15 cm³/g.

According to some embodiments, the precipitated silica may have a pore diameter (4V/A) less than or equal to about 10 nm as measured by nitrogen adsorption testing using, for example, an ASAP® 2460 Surface Area and Porosimetry Analyzer, available from Micromeritics Instrument Corporation (Norcross, Ga., USA). According to some embodiments, the magnesium silicate may have a median pore diameter in a range from about 0.1 nm to about 50 nm, such as, for example, in a range from about 0.1 nm to about 20 nm, from about 1 nm to about 10 nm, from about 2 nm to about 7 nm, from about 5 nm to about 10 nm, from about 1 nm to about 3 nm, from about 3 nm to about 5 nm, from about 4 nm to about 6 nm, from about 5 nm to about 7 nm, or from about 7 nm to about 10 nm.

According to some embodiments, the silicate substrate may have a median pore size, as measured by mercury porosimetry, in a range from about 1 micron to about 30 microns, such as, for example, in a range from about 1 micron to about 10 microns, from about 10 microns to about 20 microns, from about 20 microns to about 30 microns, from about 5 microns to about 15 microns, from about 15 microns to about 25 microns, from about 1 micron to about 5 microns, from about 5 microns to about 10 microns, from about 10 microns to about 15 microns, from about 15 microns to about 20 microns, from about 20 microns to about 25 microns, from about 2 microns to about 7 microns, from about 7 microns to about 12 microns, from about 12 microns to about 17 microns, or from about 17 microns to about 22 microns.

According to some embodiments, the cationic composite filter aid may have a wet density in a range from about 5 lbs/ft³ to about 40 lbs/ft³. For example, the cationic composite filter aid may have a wet density in a range from 5 lbs/ft³ to about 25 lbs/ft³, from about 5 lbs/ft³ to about 20 lbs/ft³, from about 5 lbs/ft³ to about 15 lbs/ft³, from about 5 lbs/ft³ to about 10 lbs/ft³, from about 10 lbs/ft³ to about 20 lbs/ft³, from about 20 lbs/ft³ to about 30 lbs/ft³, from about 15 lbs/ft³ to about 25 lbs/ft³, from about 25 lbs/ft³ to about 35 lbs/ft³, from about 15 lbs/ft³ to about 20 lbs/ft³, from about 20 lbs/ft³ to about 25 lbs/ft³, or from about 25 lbs/ft³ to about 30 lbs/ft³.

In some embodiments, the cationic composite filter aid may have a porosity in a range from about 70% to about 95%, such as, for example, in a range from about 70% to about 80%.

Silicate Substrate

According to some embodiments, the silicate substrate may include one or more silica-based filtration materials, such as, for example, biogenic silica and natural glasses.

The term "biogenic silica," as used herein, refers to silica produced or brought about by living organisms. One example of biogenic silica is diatomite, which is obtained from diatomaceous earth (also known as "DE" or "kieselguhr"). Diatomite is a sediment enriched in biogenic silica in the form of the siliceous frustules (i.e., shells or skeletons) of diatoms. Diatoms are a diverse array of microscopic, single-celled algae of the class Bacillariophyceae, which possess an ornate siliceous skeletons or frustules of varied and intricate structure including two valves which, in the living diatom, fit together much like a pill box. Diatomite may form from the remains of water-borne diatoms and, therefore, diatomite deposits may be found close to either current or former bodies of water. Those deposits are generally divided into two categories based on source: freshwater and saltwater. Freshwater diatomite is generally mined from dry lakebeds and may be characterized as having a low crystalline silica content and a high iron content. In contrast, saltwater diatomite is generally extracted from oceanic areas and may be characterized as having a high crystalline silica content and a low iron content. The morphology of the diatom frustules may vary widely among species and serves as the basis for taxonomic classification; at least 2,000 distinct species are known. The surface of each valve is punctuated by a series of openings that include the complex fine structure of the frustule and impart a design that is distinctive to individual species. The size of typical frustules may be in a range from about 0.75 microns to about 1000 microns. In some embodiments, the size of the frustules may be in a range from about 10 microns to about 150 microns. The frustules in this size range may be sufficiently durable to retain much of their porous and intricate structure virtually intact through long periods of geologic time when preserved in conditions that maintain chemical equilibrium.

Other sources of biogenic silica include plants, animals, and microorganisms, which may provide concentrated sources of silica with unique characteristics. For example, rice hulls contain sufficient silica that they can be commercially ached for their siliceous residue, a product commonly known as "rice hull ash." Certain sponges are also concentrated sources of silica, the remnants of which may be found in geologic deposits as acicular spicules.

The term "natural glass," as used herein, refers to natural glasses, which may also be referred to as "volcanic glasses," that are formed by the rapid cooling of siliceous magma or lava. Several types of natural glasses are known, including, for example, perlite, pumice, pumicite, obsidian, and pitchstone. Volcanic glasses, such as perlite and pumice, occur in massive deposits and find wide commercial use. Volcanic ash, often referred to as "tuff" when in consolidated form, includes small particles or fragments that may be in glassy form. As used herein, the term "natural glass" encompasses volcanic ash.

Natural glasses may be chemically equivalent to rhyolite. Natural glasses that are chemically equivalent to trachyte, dacite, andesite, lathe, and basalt are also known, but may be less common. The term "obsidian" is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated natural glass that may contain, for example, about 72% to about 75% $SiO_2$ by weight, about 12% to about 14% $Al_2O_3$ by weight, about 0.5% to about 2% $Fe_2O_3$ by weight, about 3% to about 5% $Na_2O$ by weight, about 4 to about 5% $K_2O$ by weight, about 0.4% to about 1.5% CaO by weight, and small amounts of other metallic elements. Perlite may be distinguished from other natural glasses by a relatively higher content (such as about 2% to about 5% by weight) of chemically-bonded water, the presence of a vitreous, pearly luster, and characteristic concentric or arcuate onion skin-like (i.e., perlitic) fractures. Perlite products may be prepared by milling and thermal expansion, and may possess unique physical properties such as high porosity, low bulk density, and chemical inertness. "Perlite," as used herein, also includes expanded perlite.

Talc is magnesium silicate mineral, a mineral chlorite (magnesium aluminum silicate), or a mixture of the two. Talc may be optionally associated with other minerals, for example, dolomite and/or magnesite. Talc also includes synthetic talc, also known as talcose. In particular embodiments, the talc may be a macro or microcrystalline talc. The individual platelet size, i.e. the median diameter as measured by the Sedigraph method, of an individual talc platelet (a few thousand elementary sheets) can vary from approximately 1 micron to over 100 microns, depending on the conditions of formation of the deposit. The individual platelet size determines the lamellarity of the talc. A highly lamellar talc will have large individual platelets, whereas a microcrystalline talc will have small platelets. Although all talcs may be termed lamellar, their platelet size differs from one deposit to another. Small crystals provide a compact, dense ore, known as "microcrystalline talc." Large crystals come in papery layers, known as "macrocrystalline talc." Known microcrystalline talc deposits are located in Montana (Yellowstone) and in Australia (Three Springs). In a microcrystalline structure, talc elementary particles are composed of small plates compared to macrocrystalline structures, which are composed of larger plates Pumice is a natural glass characterized by a mesoporous structure (e.g., having pores or vesicles, sometimes having pore sizes up to about 1 mm). The porous nature of pumice gives it a very low apparent density, in many cases allowing it to float on the surface of water. Most commercial pumice contains from about 60% to about 70% $SiO_2$ by weight. Pumice may be processed by milling and classification, and products may be used as lightweight aggregates and also as abrasives, adsorbents, and fillers. Unexpanded pumice and thermally-expanded pumice may also be used as filtration components.

Composite Filter Aids

According to some embodiments, the filter aid may include a composite filter aid. As used herein, the term "composite filter aid" refers to a material having a silicate substrate and precipitated silica. The silicate substrate may act as a filtration component while the precipitated silica may act as an adsorbent component. The composite filter aid may have different properties from either constituent silicate substrate or precipitated silica alone. According to some embodiments, the precipitated silica may include a precipitated silica coating on the silicate substrate.

In some embodiments, the precipitated silica may form an adsorbent coating or layer that has been precipitated in-situ on the surface of the silicate substrate. As a result while simple mixtures of filtration materials may segregate upon suspension (e.g., in fluid, conveyance, or transport), a composite filter aid may retain both the adsorptive of the precipitated silica and the filtration properties of the silicate substrate. The in-situ precipitation of silica onto the silicate substrate may also provide advantages, such as increased adsorption and filtration properties, over other forms of composite filter aids, such as thermally sintered or chemically bonded composites. Without wishing to be bound by a particular theory, it is believed that the in-situ precipitation process may produce a filter aid composition having adsorbent components that are more evenly distributed on the substrate and, consequently, may exhibit a larger surface area for adsorption. The larger surface area may allow the composite filter aid to adsorb a greater number of impurities and/or constituents which, in turn, may result in a lower turbidity level for the filtered fluid. Without wishing to be bound by a particular theory, it is believed that a substrate with a large surface area may allow for a reduction in the thickness of an adsorbent coating which may be formed thereon.

Without wishing to be bound by a particular theory, it is believed that the in-situ precipitation process may produce a filter aid composition having adsorbent components that are more evenly distributed on the substrate and, consequently, may exhibit a larger surface area for adsorption. The larger surface area may allow the composite filter aid to adsorb a greater number of impurities and/or constituents which, in turn, may result in a lower turbidity level for the filtered fluid. Without wishing to be bound by a particular theory, it is believed that a substrate with a large surface area may allow for a reduction in the thickness of an adsorbent coating which may, be formed thereon.

To prepare an exemplary composite filter aid, a silicate substrate, such as, for example, diatomite, biogenic silica, or natural glass, can be mixed with water to form a suspension. In some embodiments, the substrate can be a commercially-available filtration component of diatomite or perlite.

According to some embodiments, the precipitated silica may include a precipitated silica gel that is precipitated on the silicate substrate. The precipitated silica may be an amorphous silica.

To prepare an exemplary composite filter aid, a silicate substrate, such as, for example, diatomite, biogenic silica, or natural glass, can be mixed with water to form a free-flowing suspension, in some embodiments, the substrate can be the commercially-available filtration component of diatomite or perlite.

A sodium silicate solution may then added to the substrate suspension, which raises the pH. The weight ratio of sodium silicate to the substrate may be, for example, about 1:3, but any ratio may be used. The sodium silicate may include to any one of several compounds that includes sodium oxide ($Na_2O$) and silica ($SiO_2$). Such combinations may include, for example, sodium ortho silicate ($Na_4SiO_4$), sodium meta silicate ($Na_2SiO_3$), and sodium disilicate ($Na_2Si_2O_5$). In some embodiments, the sodium silicate is a diatomite-based sodium silicate. Sodium silicate with a $SiO_2/Na_2O$ ratio of about 3.2:1 and a concentration of 20% may be purchased, for example, from World Minerals Inc. Sodium silicate with a $SiO_2/Na_2O$ ratio of about 3:1 and a concentration of 34.6% may be purchased, for example, from PQ Corp.

An acid, or a salt thereof, may then be added to the slurry in an amount sufficient to increase the acidity (i.e., reduce the pH) of the slurry to a pH range suitable for the precipitation of silica onto the surface of the substrate. Any suitable acid may be selected, such selection being within the know-how of one skilled in the art. In some embodiments, the acid may include one or more of sulfuric acid, phosphoric acid, hydrochloric acid, nitric acid, and/or acetic acid. The precipitated silicate may form a coating (e.g., layer) on the substrate's surface.

As the pH lowers, the slurry may be stirred periodically. According to some embodiments, the stirring may continue until gelling of the silica occurs, which may form a coating on the substrate. According to some embodiments, stirring may occur for about 25 to about 60 minutes, depending upon the acidity of the solution and the sodium silicate concentration in the slurry. The slurry may then be filtered and water may be added to the suspension to aid filtration. The resulting cake may be washed with water. The washed cake may then be dried until the excess fluid in the cake has evaporated. For example, the cake may be dried at a temperature ranging from about 110° C. to about 200° C. The resulting cake includes a silicate filtration component, such as, for example, diatomite, having a precipitated silica coating.

According to some embodiments, the precipitated silica may include a co-gel. For example, magnesium sulfate, sodium aluminate, or both, may be added to a sodium silicate solution that forms the precipitated silica or precipitated silica gel. The addition of the sulfate or aluminate may form a silicate structure with the precipitated silicate. When the precipitated silicate is a gel, such as a silica gel, the addition of the sulfate or sodium aluminate may form a co-gel.

The amount of the sodium silicate used in the precipitation process may be chosen to control the pore size distribution in the composite filter aid. For example, increasing the percentage of precipitated silica may increase the composite filter aid's ability to act as an adsorbent; however, it may also decrease its ability to act as a filter material. Conversely, decreasing the percentage of precipitated silica may decrease the composite filter aid's ability to act as an adsorbent, but may increase its ability to act as a filter material.

According to some embodiments, the precipitated silica may include a precipitated magnesium silicate.

A magnesium silicate may be precipitated onto the surface of the silicate substrate. The silicate substrate may act as a filtration component while the precipitated magnesium silicate may act as an adsorbent component. The composite filter aid may have different properties from either constituent silicate substrate or precipitated magnesium silicate alone. According to some embodiments, the precipitated magnesium silicate may include a precipitated magnesium silicate coating on the silicate substrate. For example, the precipitated magnesium silicate may include an amorphous magnesium silicate that is precipitated on the silicate substrate.

In some embodiments, the precipitated magnesium silicate may form an adsorbent coating or layer that has been precipitated in-situ on the surface of the silicate substrate. As a result, while simple mixtures of filtration materials may segregate upon suspension (e.g., in fluid, conveyance, or transport), the composite filter aid may retain both the adsorptive of the precipitated magnesium silicate and the filtration properties of the silicate substrate. The in-situ precipitation of magnesium silicate onto the silicate substrate may also provide advantages, such as increased adsorption and filtration properties, over other forms of composite filter aids, such as thermally sintered or chemically bonded composites.

A sodium silicate solution and a magnesium sulfate ($MgSO_4$) solution may be added to the substrate suspension and the combined solution may be stirred or agitated to precipitate the magnesium silicate.

The sodium silicate may include to any one of several compounds that includes sodium oxide ($Na_2O$) and silica ($SiO_2$). Such combinations may include, for example, sodium ortho silicate ($Na_4SiO_4$), sodium meta silicate ($Na_2SiO_3$), and sodium disilicate ($Na_2Si_2O_5$). In some embodiments, the sodium silicate is a diatomite-based sodium silicate. Sodium silicate with a $SiO_2/Na_2O$ ratio of about 3.2:1 and a concentration of 20% may be purchased, for example, from World Minerals Inc. Aqueous sodium silicate with a $SiO_2:Na_2O$ ratio of about 3:1 and a concentration of 34.6% may be purchased, for example, from PQ Corp. as "N-CLEAR."

The magnesium sulfate may be any magnesium sulfate that reacts with the sodium silicate to precipitate magnesium silicate. According to some embodiments, the magnesium sulfate may be an aqueous magnesium sulfate. The molarity of the aqueous magnesium sulfate may be about 2.38 M, although any molarity may be used. The aqueous magnesium sulfate may be diluted before being combined with the sodium silicate solution to achieve a desired molarity for the precipitation with sodium silicate.

According to some embodiments, the solution of silicate substrate, sodium silicate, and magnesium sulfate may be stirred and pH stabilized during the reaction. For example, the solution may be stirred for about 2 hours. The pH may be, according to some embodiments, stabilized at about 8.8 during the reaction to precipitate magnesium sulfate onto the silicate substrate.

The solids from the slurry may then be collected, for example, by filtration or centrifugation. The collected solids may then be washed with water. The collected solids may then be re-dispersed in water and the conductivity of the resulting slurry may be measured. According to some embodiments, the collection, rinsing, and re-dispersion of the solids may be repeated until the conductivity is less than or equal to 1 millisiemen (mS).

The resulting cake may be washed with water. The washed cake may then be dried until the excess fluid in the cake has evaporated. For example, the cake may be dried at a temperature ranging from about 110° C. to about 200° C., The resulting cake includes a silicate filtration component, such as, for example, diatomite, having a precipitated magnesium silicate coating.

The amount of the sodium silicate and magnesium silicate used in the precipitation process may be chosen to control the pore size distribution in the composite filter aid and the molar ratio of magnesium oxide (MgO) to silica ($SiO_2$) in the precipitated magnesium silicate. For example, increasing the percentage of precipitated magnesium silicate may increase the composite filter aid's ability to act as an adsorbent; however, it may also decrease its ability to act as a filter material. Conversely, decreasing the percentage of precipitated magnesium silicate may decrease the composite filter aid's ability to act as an adsorbent, but may increase its ability to act as a filter material.

According to some embodiments, the mole ratio of $SiO_2$:MgO in the composite filter aid may be greater than or equal to about 3.0:1 ($SiO_2$:MgO). For example, mole ratio of $SiO_2$:MgO in the composite filter aid may be greater than or equal to about 4.0:1, greater than or equal to about 5.0:1, greater than or equal to about 6.0:1, greater than or equal to about 7.0:1, greater than or equal to about 8.0:1, greater than or equal to about 9.0:1, greater than or equal to about 10.0:1, greater than or equal to about 13.0:1, greater than or equal to about 15.0:1, greater than or equal to about 20.0:1, greater than or equal to about 25.0:1, greater than or equal to about 30.0:1, greater than or equal to about 40.0:1, greater than or equal to about 60.0:1, greater than or equal to about 80.0:1, greater than or equal to about 100.0:1, or greater than or equal to about 120.0:1 ($SiO_2$:MgO).

Cationic Modifications

The formation of a surface layer on a particle can result in stabilization due to electrostatic charges. For example, the surface of a particle may contain ionic groups that determine the surface potential. Counter ions in the solution may cover this layer and may shield the rest of the solution from the surface charges. For hydroxides the surface potential may be determined by reactions with the ions $H^+$ and $OH^-$ and the surface potential may be pH dependent. For example, particles having an M-OH surface may react with $H^+$ ions to form $M-OH_2^+$ and with $OH^-$ ions to form $M-O^-$ and $H_2O$. The pH at which a particle is neutral is called the point of zero charge, or PZC. When a solution pH is greater than the PZC, the surface of the particle is negatively charged. When a solution pH is less than the PZC, the surface is positively charged. For silica, the PZC may be about 2.5. The magnitude of the surface potential, $\varphi_0$ depends on the difference between the pH and the PZC. In water at neutral pH, silica, such as, for example, silica gels, would be more negatively charged. Thus, surface modification would be needed to create a more positively-charged surface.

According to some embodiments, the composite filter aid may be modified to impart cationic properties to the surface of the composite filter aid. Cationic properties may include, for example, a surface modification that has a positive or cationic charge. The cationic modification may modify some, about half, more than half, or substantially all of the surface of the composite filter aid. According to some embodiments, the cationic modification may modify the exterior surface of the composite filter aid, but may not modify some interior surfaces, such as pores, depending on the pore size of the precipitated silica.

According to some embodiments, the cationic modification may include a cationic surface modification. The cationic surface modification may include a cationic polymer, such as, for example, a cationic resin.

According to some embodiments, the cationic surface modification may include at least one coupling agent attached, either chemically, physically, or electrostatically, to the precipitated silica. The coupling agent may be modified with a cationic modification, such as, for example, a cationic polymer. According to some embodiments, the at least one coupling agent may include at least one of an amino functional silane and an isocyanato functional silane. According to some embodiments, the coupling agent may be reacted with a cationic polymer.

According to some embodiments, the cationic surface modification may include at least one of a polyamine, a polyamide, a polyethyleneimine, are epoxide, polylysine, chitosan, a functional silane, a functional siloxane, a cyclic azasilane, and an amino acid. According to some embodiments, a functional silane may include an amino functional silane. According to some embodiments, an amino acid may include a protein or polypeptide. According to some embodiments, a polyamide may include polyamide epichlorohydrin. According to some embodiments, a polyamine may include polyamine epichlorohydrin, such as, for example, a polyamine identified under the trade name "Polycup" by Solenis (formerly Ashland Chemicals, formerly Hercules). The polyethyleneimine could be identified under the trade name "Lupasol P" by BASF.

According to some embodiments, the cationic surface modification may include at least one titanate. According to some embodiments, the cationic surface modification may include an organo titanate.

According to some embodiments, the cationic modification may include an amine functional molecule. The amine functional molecule may form a cationic surface modification of the precipitated silica or may catatonically modify a coupling agent. According to some embodiments, the coupling agent may include a polyamine, such as, for example, an aliphatic polyamine, ethylenediamine, diethylenetriamine, triethylenetetramine, tetraethylenepentamine, or a polyethylenimine. For example, the polyethyleneimine may include trimethoxysilylpropyl-modified(polyethylenimine) or dimethoxysilylmethylpropyl-modified(polyethylenimine).

According to some embodiments, a cationic modification, such as, for example, a cationic surface modification may include at least one of trialkoxysilane, such as, for example, aminopropyl trialkoxysilane, or a triethoxysilane, such as, for example, aminopropyltriethoxysilane.

According to some embodiments, the cationic surface modification may include a cross-linked resin. According to some embodiments, a cross-linker of the cross-linked resin may include at least one of a polyamine cross-linker and an amino acid cross-linker. An amino acid may include a protein or polypeptide. According to some embodiments, a cross-linker of the cross-linked resin may include a diisocyanate, anhydride, diepoxide, or dicarboxylic acid.

According to some embodiments, the cationic modification may include a siloxane or a silane as either a coupling agent or as the cationic modification, such as, for example, a cationic surface modification of the precipitated silica. In some embodiments, modification may be performed through silanizing treatments of the composite filter aid.

In general, siloxanes are any of a class of organic or inorganic chemical compounds comprising silicon, oxygen, and often carbon and hydrogen, based on the general empirical formula of $R_2SiO$, where R may be an alkyl group. Exemplary siloxanes may include, but are not limited to, dimethylsiloxane, methylphenylsiloxane, methylhydrogen siloxane, methylhydrogen polysiloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In general, silanes and other monomeric silicon compounds have the ability to bond to inorganic materials, such as the precipitated silica. The bonding mechanism may be aided by two groups in the silane structure, where, for example, the $Si(OR_3)$ portion interacts with the composite filter aid, while the organofunctional (vinyl-, amino-, epoxy-, etc.) group may interact with other materials.

In one embodiment, the composite filter aid may be subjected to at least one surface treatment with at least one ionic silane. Exemplary ionic silanes include, but are not limited to, 3-(trimethoxysilyl) propyl-ethylenediamine triacetic acid trisodium salt and 3-(trihydroxysilyl)propylmethylphosphonate salt. In another embodiment, the composite filter aid is subjected to at least one surface modification with at least one nonionic silane.

In a further embodiment, the composite filter aid is subjected to at least one surface modification with at least one silane of Formula (I):

$$(R^1)_x Si(R^2)_{3-x} R^3 \qquad (I)$$

wherein:
R$^1$ is any hydrolysable moiety that may chemically react with any active group on the surface of the composite filter aid, including, but not limited to, alkoxy, halogen, hydroxy, aryloxy, amino, amide, methacrylate, mercapto, carbonyl, urethane, pyrrole, carboxy, cyano, aminoacyl, acylamino, alkyl ester, and aryl ester;

X has a value between 1 and 3, such that more than one siloxane bond may be formed between the composite filter aid and the at least one silane;

$R^2$ is any carbon-bearing moiety that does not substantially react or interact with the composite filter aid during the treatment process, including, but not limited to, substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl;

$R^3$ is any organic-containing moiety that remains substantially chemically attached to the silicon atom of Formula (I) once the at least one surface modification is completed and that is capable of reacting or interacting with an active ingredient, such as, but not limited to, hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by, for example, halogen, hydroxy, amino, carboxy, or cyano.

According to some embodiments, the cationic surface modification may include an alkoxysilane, such as, for example, a trialkoxysilane, a dialkoxysilane, or a monoalkoxysilane. According to some embodiments, the cationic surface modification may include aminopropyl trialkoxysilane. According to some embodiments, the cationic surface modification may include an ethoxysilane, such as, for example, a triethoxysilane. According to some embodiments, the cationic surface modification may include aminopropyltriethoxysilane.

According to some embodiments, the cationic surface modification may include an amine functional silane, such as, for example, a monoamine functional silane, a diamine functional silane, a triamine functional silane, a secondary amine functional silane, a tertiary amine functional silane, a quaternary amine functional silane, a dipodal amine functional silane, or an aminoslkylsilsesquioxane oligomer. According to some embodiments, the amine functional silane may include at least one of a monoalkoxy, dialkoxy, or trialkoxy amine functional silane.

According to some embodiments, the cationic surface modification may include at least one of 4-aminobutyltriethoxysilane, 4-amino-3,3-dimethylbutyltrimethoxysilane, aminoneohexyltrimethoxysilane, n-(2-aminoethyl)-3-aminopropyltriethoxysilane, 3-(m-aminophenoxy)propyltrimethoxysilane, m-aminophenyltrimethoxysilane, p-aminophenyltrimethoxysilane, aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyl)trimethoxysilane, 2-(trimethoxysilylethyl)pyridine, n-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylethoxysilane, 3-aminopropyldimethylethoxysilane, (aminoethylaminomethyl)phenethyltrimethoxysilane, n-(2-aminoethyl)-3-aminopropyltrimethoxysilane, n-[3-(trimethoxysilyl)propyl] ethylenediamine, n-(6-aminohexyl) aminomethyltriethoxysilane, n-(6-aminohexyl) aminopropyltrimethoxysilane, n-(2-aminoethyl)-11-aminoundecyltrimethoxysilane, n-3-[(amino (polypropylenoxy)]aminopropyltrimethoxysilane, n-(2-n-benzylaminoethyl)-3-aminopropyltrimethoxysilane, n-(2-aminoethyl)-3-aminopropylsilanetriol, n-(2-aminoethyl)-3-aminopropyl trimethoxysilane-propyl trimethoxysilane, n-(2-aminoethyl)-3-aminoisobutylmethyldimethoxysilane, n-(2-aminoethyl)-3-aminopropylmethyldiethoxysilane, n-(2-aminoethyl)-3-aminopropylmethyldimethoxysilane, n-(2-aminoethyl)-3-aminoisobutyldimethylmethoxysilane, (3-trimethoxysilylpropyl)diethylenetriamine, 3-(n-allylamino)propyltrimethoxysilane, n-butylaminopropyltrimethoxysilane, t-butylaminopropyltrimethoxysilane, (n-cyclohexylaminomethyl)methyldiethoxysilane, (n-cyclohexylaminomethyl)triethoxysilane, (n-cyclohexylaminopropyl)trimethoxysilane, (3-(n-ethylamino)isobutyl)methyldiethoxysilane, (3-(n-ethylamino)isobutyl)trimethoxysilane, n-methylaminopropylmethyldimethoxysilane, (phenylaminomethyl)methyldimethoxysilane, n-phenylaminomethyltriethoxysilane, n-phenylaminopropyltrimethoxysilane, n, n-bis(2-hydroxyethyl)-3-aminopropyltriethoxysilane, bis(3-trimethoxysilylpropyl)-n-methylamine, 3-carbazolylpropyltriethoxysilane, (n,n-diethylaminomethyl)triethoxysilane, (n, n-diethylaminomethyl)trimethoxysilane, (n,n-diethyl-3-aminopropyl)trimethoxysilane, 3-(n, n-dimethylaminopropyl)aminopropylmethyldimethoxysilane, n, n-dimethyl-3-aminopropylmethyldimethoxysilane, (n, n-dimethyl-3-aminopropyl)trimethoxysilane, n-methyl-n-trimethylsilyl-3-aminopropyltrimethoxysilane, tris(triethoxysilylmethyl) amine, tris(triethoxysilylpropyl)amine, n-(2-n-benzylaminoethyl)-3-aminopropyltrimethoxysilane hydrochloride, n,n-didecyl-n-methyl-n-(3-trimethoxysilylpropyl)ammonium chloride, octadecyldimethyl(3-trimethoxysilylpropyl)ammonium chloride, (styrylmethyl) bis(triethoxysilylpropyl)ammonium chloride, 3-(n-styrylmethyl-2-aminoethylamino)propyltrimethoxysilane hydrochloride, tetradecyldimethyl(3-trimethoxysilylpropyl) ammonium chloride, 4-(trimethoxysilylethyl)benzyltrimethylammonium chloride, s-(trimethoxysilylpropyl)isothiouronium chloride, trihydroxypropylcarbamidothioic acid hydrochloride, n-trimethoxysilylpropyl-n,n,n-trimethylammonium chloride, n,n,n-trimethyl-3-(trimethoxysilyl)-1-propanaminium chloride, 1-[3-(2-aminoethyl)-3-aminoisobutyl]-1,1,3,3,3-pentaethoxy-1,3-disilapropane, bis (methyldiethoxysilylpropyl)amine, bis (methyldimethoxysilylpropyl)-n-methylamine, bis(3-triethoxysilylpropyl)amine, n, n'-bis[3-(triethoxysilyl) propyl]urea, 1,11-bis(trimethoxysilyl)-4-oxa-8-azaundecan-6-ol, 3,3,15,15-tetramethoxy-2,7,16-trioxa-11-aza-3,15-disilaheptadecan-9-ol, 2,2-dimethoxy-1,6-diaza-2-silacyclooctane, (n,n-dimethylaminopropyl)-aza-2-methyl-2-methoxysilacyclopentane, 1-ethyl-2,2-dimethoxy-4-methyl-1-aza-2-silacyclopentane, (1-(3-triethoxysilyl) propyl)-2,2-diethoxy-1-aza-2-silacyclopentane, aminopropylsilsesquioxane, aminoethylaminopropylsilsesquioxane, aminoethylaminopropyininyusilsesquioxane, trimethoxysilylpropyl-modified(polyethylenimine), dimethoxysilylmethylpropyl-modified(polyethylenimine).

According to some embodiments, the composite filter aid may have a hydroxyl-bearing porous surface that may be subjected to at least one surface modification with at least one silane, such that the composite filter aid surface is chemically bonded to the at least one silane. In such an embodiment, the surface area of the composite filter aid may limit the amount of the bound silane. As a result, it may be preferable to subject the composite filter aid to at least one physical surface modification that increases the surface area of the composite filter aid prior to treatment with the at least one silane.

In some embodiments, silanization may proceed according to "wet" or "dry" processes known to the skilled artisan. For example, a "wet" process generally includes reacting the at least one silane onto the composite filter aid in at least one solvent (e.g., organic solvent or water). In some embodiments, heat may be used in place of, or in addition to, the at least one solvent. Although heat and solvents are not required for a "wet" process, they may improve the reaction rate and promote uniform surface coverage of the treatment. In another embodiment, a "wet" process includes in-line mixing of slurries or liquids during typical silanization processing steps, including but not limited to filtration and drying.

In some embodiments, a "dry" silanization process generally includes reacting at least one silane with the composite filter aid in a vapor phase by mixing the at least one silane with the composite filter aid and then heating the mixture. In some embodiments, a "dry" silanization process includes reacting at least one silane with the composite filter aid in a stirred liquid phase by mixing the at least one silane with the composite filter aid and then heating the mixture. In still other embodiments, a "dry" silanization process includes mixing at least one silane with the composite filter aid and incubating in a sealed container at elevated temperatures to speed up the surface modification process. In yet other embodiments, the "dry" silanization process includes mixing the composite filter aid and a liquid silane additive, where the amount of silane added is small enough that the reaction mass remains solid-like and can continue to be processed like a dry particulate material.

According to some embodiments, a cyclic azasilane may be used to modify the surface chemistry of the composite filter aid. For example, anhydrous deposition of a cyclic azasilane may be used to perform a surface modification.

In some embodiments, the composite filter aid is subjected to at least one surface modification with at least one silane by adding the at least one silane gradually to a rapidly stirred solvent, which is in direct contact with the composite filter aid. In another embodiment, the composite filter aid is subjected to at least one surface modification with at least one silane by carrying out the treatment in a vapor phase, which causes the vapor of the at least one silane to contact and react with the composite filter aid.

In some embodiments, the treatment of the composite filter aid may include treatment with a silane or siloxane with cationic properties to impart cationic properties to the composite filter aid.

In some embodiments, the silane or siloxane may be cationically modified to impart or enhance cationic charges to the composite filter aid. According to some embodiments, the silane or siloxane may be modified to substitute cationic functional groups to the silane or siloxane, such as, for example, ammonium groups.

According to some embodiments, the cationic modification may include treatment with at least one polyvalent metal-oxygen compound.

Filter Aid Compositions

The cationic composite filter aid may be used as part of a filter aid composition. For example, according to some embodiments, the cationic composite filter aid may be used as a filter aid for filtering liquids, such as aqueous or non-aqueous liquids. Non-aqueous liquids may include, for example, fatty acid alkyl esters (FAAEs), biodiesel, edible oils, oil, such as an edible oil, animal oils, animal fats, hydrogenated oils, palm oil, palm kernel oil, cocoa butter, cocoa butter substitutes, illipe fat, shea fat, canola oil, castor oil, coconut oil, coriander oil, corn oil, cottonseed oil, hazelnut oil, hempseed oil, linseed oil, mango kernel oil, olive oil, peanut oil, rapeseed oil, rice bran oil, safflower oil, soybean oil, and sunflower oil, or combinations thereof. Non-aqueous liquids may include, for example, liquids comprising less than or equal to about 25% water.

According to some embodiments, the cationic composite filter aid may reduce the metal content of a liquid, such as, for example, by adsorption and/or filtration of metals or metal ions. Metals that may be adsorbed or filtered include, but are not limited to, sodium, calcium, potassium, iron, magnesium, and phosphorus. In some embodiments, the composite filter aid may reduce the metal content by greater than or equal to about, for example, 90%, 85%, 80%, 75%, 70%, 65%, 60%, 55%, or 50%. For example, as measured according to EN 14538, iron content may be reduced by greater than or equal to about 60%, 65%, 70%, 75%, 80%, 85%, or 90%. According to some embodiments, non-iron metal content may be reduced by greater than or equal to about, for example, 50%, 55%, 60%, 65%, 70%, 75%, or 80%. According to some embodiments, the amount of metal reduction may be affected by other parameters, such as, for example, the amount of metal present prior to filtration.

The cationic composite filter aids described herein may also serve as replacement filter aids for diatomaceous earth, silica gel, or hydrogel filter aids. When compared with hydrogel filter aids, the cationic composite filter aids may have acceptable filtration performance but may have improved filtration of negatively charged impurities, such as negative ions or molecules having negative charges or negative charge regions. Without wishing to be bound by a particular theory, it is believed that the silicate substrate has a microporous structure, while precipitated silica may have a nanoporous structure. This combination of microporosity and nanoporosity aids in filtering impurities of various size ranges. For example, the nanoporosity may aid in filtering metal and small molecule impurities, while the microporosity may aid in filtering large molecules such as soaps. The positive charge imparted by the cationic modification may improve adsorption of negative charges, whereas regions without cationic modification may still adsorb positively-charged impurities. This may result in more effective or comprehensive filtration.

As used herein, "adsorption" is the tendency of molecules from an ambient fluid phase to adhere to the surface of a solid. This is not to be confused with the term "absorption," which results when molecules from an ambient fluid diffuse into a solid, as opposed to adhering to the surface of the solid.

To achieve a desired adsorptive capacity, such as may be specified for commercial use, the cationic composite filter aids may have a relatively large surface area, which may imply a fine porous structure. In certain embodiments, porous filter aids, in their un-reacted powder form, can have surface areas ranging up to several hundred $m^2/g$.

As used herein, "surface area" refers to a BET surface area. "BET surface area," as used herein, refers to the technique for calculating specific surface area of physical absorption molecules according to Brunauer, Emmett, and Teller ("BET") theory. BET surface area can be measured with a Gemini III 2375 Surface Area Analyzer, using nitrogen as the sorbent gas, or ASAP® 2460 Surface Area and Porosimetry Analyzer, available from Micromeritics Instrument Corporation (Norcross, Ga., USA).

Filtration components with different BET surface areas and/or different total pore areas may result in different adsorption capacity and filtration rate. Typically, a filter aid with a lower BET and/or lower total pore area tends to have a lower adsorption capacity and a faster filtration rate. For example, calcined diatomaceous earth filter aids and expanded and milled perlite filter aids may serve as filter aids with higher flow rates, but with minimal adsorption function, because of the low surface area, which is typically less than 10 $m^2/g$. Adsorbent components, such as silica gels, are generally high in BET surface areas or total pore areas, but their filtration rates are generally low, due to a much finer particle size distribution and/or the lack of porosity. The fine particles can block the pores during filtration, and the high surface area may create more drag on the flow, thus causing the filtration rate drop significantly. The cationic composite filter aids described herein may provide both acceptable filtration rates and adsorption and impurity removal properties, as compared to untreated silicates (e.g., diatomaceous earth), silica gels, or pure magnesium silicates alone.

According to some embodiments, the cationic composite filter aid may have a BET surface area in a range from about 1 $m^2/g$ to about 300 $m^2/g$. For example, the cationic composite filter aid may have a BET surface area in a range from about 5 $m^2/g$ to about 200 $m^2/g$, from about 50 $m^2/g$ to about 250 $m^2/g$, from about 100 $m^2/g$ to about 200 $m^2/g$, from about 150 $m^2/g$ to about 250 $m^2/g$, from about 10 $m^2/g$ to about 150 $m^2/g$, from about 30 $m^2/g$ to about 150 $m^2/g$, from about 30 $m^2/g$ to about 100 $m^2/g$, from about 50 $m^2/g$ to about 100 $m^2/g$, from about 50 $m^2/g$ to about 70 $m^2/g$, from about 60 $m^2/g$ to about 80 $m^2/g$, from about 70 $m^2/g$ to about 90 $m^2/g$, about 50 $m^2/g$ to about 200 $m^2/g$, from about 50 $m^2/g$ to about 150 $m^2/g$, from about 100 $m^2/g$ to about 200 $m^2/g$, or from about 100 $m^2/g$ to about 150 $m^2/g$.

One technique for describing pore size distributions in materials is mercury intrusion porosimetry, which uses mercury intrusion under applied isostatic pressure to measure micron-scale pores, such as those of the silicate substrate. In this method a material is surrounded by liquid mercury in a closed evacuated vessel and the pressure is gradually increased. The vessel is sealed and the pressure is reduced to a very low level before mercury intrusion begins. At low pressures, the mercury will not intrude into the powder sample due to the high surface tension of liquid mercury. As the pressure is increased, the mercury is forced into the sample, but will first intrude into the largest spaces, where the curvature of the mercury surface will be the lowest. As pressure is further increased, the mercury is forced to intrude into tighter spaces of the material. Eventually all the voids will be filled with mercury. Nano-porous structure was measured by nitrogen adsorption using an ASAP® 2460 Surface Area and Porosimetry Analyzer, available from Micromeritics Instrument Corporation (Norcross, Ga., USA). The plot of total void volume vs. pressure can thus be developed. The method can thus provide not only total pore volume, but also distinguish a distribution of pore sizes. Once a distribution of pores has been estimated, it is possible to calculate an estimation of surface area based on the pore sizes, and by assuming a pore shape (a spherical shape may be commonly assumed). Median pore size estimates can also be calculated based on volume or area. Median pore size (volume) is the pore size at $50^{th}$ percentile at the cumulative volume graph, while median pore size (area) is the $50^{th}$ percentile at the cumulative area graph. The average pore size (diameter) is four times the ratio of total pore volume to total pore area (4V/A).

According to some embodiments, the silicate substrate, e.g., diatomite, may have a median pore diameter (4V/A) in a range from about 0.1 micron to about 30 microns, such as, for example, in a range from about 1 micron to about 10 microns, from about 10 microns to about 20 microns, from about 20 microns to about 30 microns, from about 5 microns to about 15 microns, from about 15 microns to about 25 microns, from about 0.5 microns to about 5 microns, from about 1 micron to about 5 microns, from about 5 microns to about 10 microns, from about 10 microns to about 15 microns, from about 15 microns to about 20 microns, from about 20 microns to about 25 microns, from about 25 microns to about 30 microns, from about 0.1 micron to about 5 microns, from about 2 microns to about 7 microns, from about 7 microns to about 12 microns, from about 12 microns to about 17 microns, from about 17 microns to about 22 microns, or from about 22 microns to about 27 microns.

According to some embodiments, the silicate substrate may have a median pore diameter (volume) in a range from about 0.1 micron to about 10 microns, such as, for example, in a range from about 0.1 micron to about 5 microns, from about 0.5 micron to about 3 microns, from about 1 micron to about 5 microns, from about 5 microns to about 10 microns, from about 2 microns to about 8 microns, or from about 3 microns to about 6 microns.

According to some embodiments, the silicate substrate may have a median pore diameter (area) in a range from about 1 nm to about 50 nm, such as, for example, in a range from about 1 nm to about 20 nm, from about 1 nm to about 10 nm, from about 1 nm to about 5 nm, from about 5 nm to about 10 nm, or from about 3 nm to about 8 nm.

According to some embodiments, the precipitated silica may have a pore size less than or equal to about 50 nm as measured by nitrogen adsorption using an ASAP 2460 Surface Area and Porosimetry Analyzer using the BJH technique. For example, the precipitated silica may have a pore size less than or equal to about 15 nm, less than or equal to about 20 nm, less than or equal to about 15 nm, less than or equal to about 10 nm, less than or equal to about 8 nm, less than or equal to about 7 nm, less than or equal to about 6 nm, less than or equal to about 5 nm, or less than or equal to about 4 nm. According to some embodiments, the precipitated silica may have a pore size in a range from about 0.1 nm to about 20 nm, such as, for example, in a range from about 5 nm to about 20 nm, from about 5 nm to about 15 nm, from about 5 nm to about 10 nm or from about 10 nm to about 15 nm, from about 0.1 nm to about 5 nm, from about 1 nm to about 5 nm, from about 2 nm to about 7 nm, from about 5 nm to about 10 nm, from about 1 nm to about 3 nm, from about 3 nm to about 5 nm, from about 4 nm to about 6 nm, from about 5 nm to about 7 nm, or from about 7 nm to about 10 nm.

According to some embodiments, the precipitated silica may have a BJH pore volume (1.7 nm to 300 nm) in a range from about 0.05 $cm^3/g$ to about 0.5 $cm^3/g$ as measured as described above. For example, the precipitated magnesium silicate may have a BJH pore volume (1.7 nm to 300 nm) in a range from about 0.05 $cm^3/g$ to about 0.5 $cm^3/g$, from about 0.08 $cm^3/g$ to about 0.45 $cm^3/g$, from about 0.10 $cm^3/g$ to about 0.30 $cm^3/g$, from about 0.15 $cm^3/g$ to about 0.45 $cm^3/g$, from about 0.15 $cm^3/g$ to about 0.25 $cm^3/g$, from about 0.25 $cm^3/g$ to about 0.35 $cm^3/g$, or from about 0.35 $cm^3/g$ to about 0.45 $cm^3/g$.

According to some embodiments, the cationic composite filter aids may be processed to provide a wide range of flow rates, which are related to permeability. The cationic composite filter aids disclosed herein may have a permeability suitable for use in filtering aqueous and/or non-aqueous liquids. Permeability is generally measured in Darcy units or darcies. Permeability may be determined using a device designed to form a filter cake on a septum from a suspension of filter aid in water, and then measuring the time required for a specified volume of water to flow through a measured thickness of filter cake of known cross-sectional area. For example, the permeability may be measured through a porous of filter aid material 1 cm high and with a 1 cm$^2$ section through which flows a fluid with a viscosity of 1 mPa·s with a flow rate of 1 cm$^3$/sec under an applied pressure differential of 1 atmosphere. The principles for measuring permeability have been previously derived for porous media from Darcy's law (see, for example, J. Bear, "The Equation of Motion of a Homogeneous Fluid: Derivations of Darcy's Law," in Dynamics of Fluids in Porous Media 161-177 (2nd ed. 1988)).

According to some embodiments, the cationic composite filter aids may have a permeability in a range from 50 millidarcies ("md") to 5000 md. Permeability measurements were conducted using a dilute aqueous solution of NaCl+ Na$_2$SO$_4$+Na$_2$CO$_3$ having properties that mimic natural water with a fixed viscosity-temperature curve. For example, the cationic composite filter aids may have a permeability in a range from about from about 50 md to about 1000 md, from about 50 md to about 500 md, from about 50 md to about 300 md, from about 50 md to about 200 md, from about 50 md to about 100 md, from about 100 md to about 400 md, from about 100 md to about 300 md, from about 100 md to about 200 md, from about 200 md to about 300 md, from about 100 md to about 4000 md, from about 100 md to about 3000 md, from about 500 md to about 3000 md, from about 500 md to about 1500 md, from about 1500 md to about 3000 md, from about 200 md to about 2000 md, from about 100 md to about 1000 md, from about 100 md to about 500 md, from about 100 md to about 300 md, from about 300 md to about 800 md, from about 500 md to about 1000 md, from about 800 md to about 1200 md, from about 1000 md to about 1500 md, from about 1500 md to about 2000 md, from about 2000 md to about 2500 md, from about 2500 md to about 3000 md, or from about 1000 md to about 2000 md.

According to some embodiments, the precipitated silica may form a coating on the silicate substrate. According to some embodiments, the amount of precipitated silica may be less than or equal to about 80% by weight of the composite filter aid, such as, for example, less than or equal to about 50%, less than or equal to about 40%, less than or equal to about 35%, less than or equal to about 30%, less than or equal to about 25%, less than or equal to about 20%, less than or equal to about 15%, or less than or equal to about 5% by weight of the composite filter aid.

The amount of precipitated silica may be in a range from about 1% to about 80% by weight of the composite filter aid, such as, for example, from about 1% to about 50%, from about 5% to about 60%, from about 5% to about 40%, from about 10% to about 30%, from about 1% to about 10%, from about 10% to about 20%, from about 20% to about 30%, from about 30% to about 40%, from about 1% to about 5%, from about 5% to about 15%, from about 15% to about 25%, from about 25% to about 35%, or from about 35% to about 45% by weight of the composite filter aid.

The cationic composite filter aids disclosed herein have a particle size. Particle size may be measured by any appropriate measurement technique now known to the skilled artisan or hereafter discovered. In one exemplary method, particle size and particle size properties, such as particle size distribution ("psd"), are measured using a Leeds and Northrup Microtrac X100 laser particle size analyzer (Leeds and Northrup, North Wales, Pa., USA). The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

According to some embodiments, the cationic composite filter aids may have a median particle size ($d_{50}$) in a range from about 5 microns to about 50 microns, such as, for example, from about 5 microns to about 40 microns, from about 10 microns to about 40 microns, from about 10 microns to about 30 microns, or from about 15 microns to about 25 microns.

The cationic composite filter aids have a measurable wet density. "Wet density" is an indicator of a material's porosity. For example, wet density reflects the void volume available to entrap particulate matter in a filtration process and, consequently, wet density may be used to determine filtration efficiency. Wet density also indicates the percent porosity of a material, which may be expressed by the following formula:

Porosity=100*[1−(wet density/true density)].

Thus, filtration components with lower wet densities may result in products with greater porosity, and thus perhaps greater filtration efficiency, provided that the true density stays relatively constant. Because wet density reflects the void volume of the adsorbent component to entertain matter in the filtration process, a lower wet density may indicate that the adsorbent component has a high void volume and thus can adsorb more particles and/or constituents in the fluid.

According to one exemplary method, to measure wet density, a material sample of known weight from about 1.00 g to about 2.00 g is placed in a calibrated 15 ml centrifuge tube. Deionized water is then added to make up a volume of approximately 10 ml. The mixture is shaken thoroughly until all of the sample is wetted, and no powder remains. Additional deionized water is added around the top of the centrifuge tube to rinse down any mixture adhering to the side of the tube from shaking. The tube is then centrifuged for 5 minutes at 2500 rpm on an IEC Centra® MP-4R centrifuge, equipped with a Model 221 swinging bucket rotor (International Equipment Company; Needham Heights, Mass., USA).

Following centrifugation, the tube is carefully removed without disturbing the solids, and the level (i.e., volume) of the settled matter is measured in cm$^3$. The centrifuged wet density of powder can be calculated by dividing the sample weight by the measured volume. According to some embodiments, the cationic composite filter aid may have a wet density in a range from about 10 lbs/ft$^3$ to about 40 lbs/ft$^3$. For example, the cationic composite filter aid may have a wet density in a range from about 10 lbs/ft$^3$ to about 20 lbs/ft$^3$, from about 20 lbs/ft$^3$ to about 30 lbs/ft$^3$, from about 15 lbs/ft$^3$ to about 25 lbs/ft$^3$, from about 25 lbs/ft$^3$ to about 35 lbs/ft³, from about 15 lbs/ft³ to about 20 lbs/ft³, from about 20 lbs/ft³ to about 25 lbs/ft³, or from about 25 lbs/ft³ to about 30 lbs/ft³.

Exemplary Uses for Composite Filter Aids

The exemplary cationic composite filter aids disclosed herein may be used in any of a variety of processes, applications, and materials, such as, for example, filtering aqueous and non-aqueous liquids. For example, the cationic composite filter aids may be used to filter oils, water, beer, wine, juice, sweeteners, syrups, or wastewater.

For example, the cationic composite filter aids may be used to adsorb, chelate, or scavenge impurities from a fluid. The filtered impurities may include negatively charged or anionic impurities, such as, for example, certain hazardous metals, such as heavy metals or anionic metal ions such as arsenic. According to some embodiments, the anionic surface modification may improve color removal, such as, for example, decolorization of natural oils through adsorption of chlorophyll or oxidation byproducts. The cationic composite filter aids may also have improved filtration of polyphenols.

According to some embodiments, the cationic composite filter aids may include at least one adsorbent, such as, for example, activated carbon or clay materials.

FIG. 1A shows a schematic of an exemplary silicate filter aid, such as, for example, a diatomaceous earth filter aid or a composite filter aid without a cationic modification. As shown in FIG. 1A, the surface of the silicate has a negative charge. This is confirmed by placing the composite filter aid in a suspension of Methyl Blue dye, which has a positive charge. As shown by the vials in FIG. 1A, the positively-charged Methyl Blue dye was adsorbed to the composite filter aid, confirming the negative or anionic surface charge of the composite filter aid.

Figure 1B:
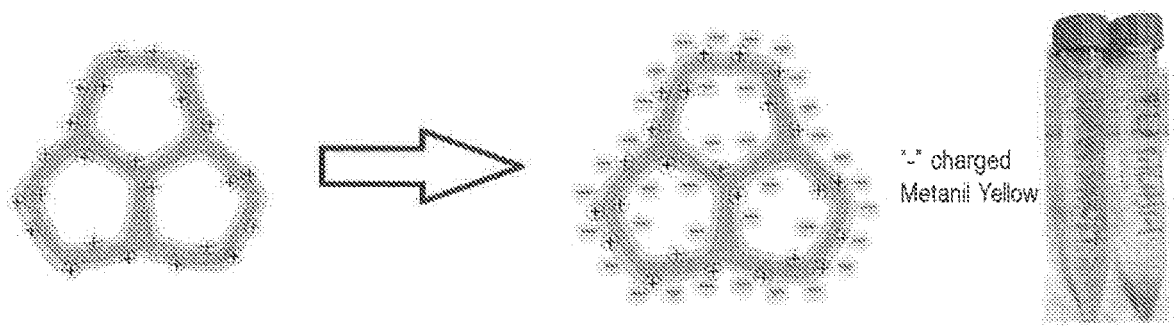
FIG. 1B shows an exemplary diagram and image of a cationic composite filter aid adsorbing negatively charged Metanil Yellow dye.

FIG. 1B shows a schematic of an exemplary cationic composite filter aid. As shown in FIG. 1B, the surface of the cationic composite filter aid has been modified to have a positive or cationic surface charge. This is confirmed by placing the composite filter aid in a suspension of Metanil Yellow Dye, which has a negative charge. As shown by the vials in FIG. 1B, the negatively-charged Metanil Yellow dye was adsorbed to the cationic composite filter aid, confirming the positive or cationic surface charge of the cationic composite filter aid.

The exemplary cationic composite filter aids may be used in a variety of filtration processes and compositions. According to some embodiments, a filter element may be used to support the cationic composite filter aid. In some embodiments, the filter element contains filter element voids through which fluid may flow. In some embodiments, the cationic composite filter aid may be applied to a filter septum to protect it and/or to improve clarity of the liquid to be filtered in a filtration process. In some embodiments, the cationic composite filter aid may be added directly to the fluid, such as a non-aqueous fluid (e.g., biodiesel or edible oils) to be filtered to increase flow rate and/or extend the filtration cycle. In some embodiments, the cationic composite filter aids may be used as a pre-coating layer for a filter element, in body feeding to help improve the usable life of a filter cake and/or to maintain flow properties through the filter, or in a combination of both pre-coating and body feeding, in a filtration process.

Embodiments of the cationic composite filter aids may also be used in a variety of filtering methods. In some embodiments, the filtering method includes pre-coating at least one filter element with the cationic composite filter aid, and contacting at least one liquid to be filtered with the at least one coated filter element. In such embodiments, the contacting may include passing the liquid through the filter element. In some embodiments, the filtering method includes suspending the cationic composite filter aid in the liquid to be filtered, and thereafter separating the cationic composite filter aid from the filtered liquid.

Although certain embodiments may be described with reference to the cationic composite filter aids, it is understood that these are exemplary only and that the cationic composite filter aids may additionally be combined with other filter aid materials, such as, for example, diatomaceous earth, natural glasses, silica gels, magnesium silicate particles, or hydrogels.

Example

An exemplary cationic composite filter aid was prepared. First, 50.0 g of silica-gel coated diatomaceous earth, commercially available as Celite Cynergy® by Imerys Filtration & Performance Additives, was added to a 0.5 liter beaker with 250 ml water and stirred with an agitator at 150 rpm. Then, 0.06 g of sodium hydroxide was added to the beaker and the pH stabilized at 10.0. Next, 0.25 mL of triethoxysilylpropyl isocyanate was added with agitation to the beaker and allowed to react for 1 hour. Then, 3.0 g of 50% polyethyleneimine solution, commercially available as "Lupasol P" from BASF SE was added with agitation to the beaker and allowed to react for 1 hour.

After the reaction, the solid component was collected by vacuum filtration. The solid was then rinsed with about 80 mL of water about five times. The rinsed solid was re-dispersed in 250 mL of water, and the conductivity was measured. The rinsing and re-dispersion process was repeated until the measured conductivity was less than 1 milisiemens (mS). The solid was then collected by vacuum filtration and dried overnight at 80° C. A control sample of the composite filter aid was also prepared without the cationic surface modification.

The anion removal properties of the cationic composite filter aid were determined by placing 0.50 g or 1.00 g of adsorbent, either the exemplary cationic composite filter aid or the control composite filter aid, as a filtration element in an Erlenmeyer flask containing 50 mL of water and titrated with 0.02 M HCl to pH 4.0. Water in an amount of 25 mL minus the HCl titration volume was then added to the flask. Then 5.0 mg or 10.0 mg of Metanil Yellow dye was added.

The liquid components were collected by vacuum filtration, and the removal of the dye was calculated by measurement of light absorbance at 414 nm. The results are shown below in Table 1. As shown in Table 1, 1.0 g control composite filter aid removed 18% of the Metanil Yellow dye, whereas 1.0 g the exemplary cationic composite filter aid removed greater than 99% of the Metanil Yellow dye for the 5.0 mg dye solutions. As also shown in Table 1, 1.00 g of the exemplary cationic composite filter aid also removed greater than 99% of the 10 mg dye solution and 0.5 g of the exemplary cationic composite filter aid removed 96% of the 10 mg dye solution.

TABLE 1

| Adsorbant | None | Control | Example Cationic Composite | Example Cationic Composite | Example Cationic Composite |
|---|---|---|---|---|---|
| Adsorbant (g) | 1.00 | 1.00 | 1.00 | 1.00 | 0.50 |
| Metanil Yellow Dye (mg) | 5.0 | 5.0 | 5.0 | 10.0 | 10.0 |

TABLE 1-continued

| Adsorbant | None | Control | Example Cationic Composite | Example Cationic Composite | Example Cationic Composite |
|---|---|---|---|---|---|
| Total solution (ml) | 75 | 75 | 75 | 75 | 75 |
| Dye removal (%) | — | 18 | >99 | >99 | 96 |

FIG. 2 shows the Metanil Yellow adsorption results of this example. As shown in FIG. 2, the control composite filter aid adsorbed very little of the negatively-charged Metanil Yellow dye. The same amount of cationic composite filter aid adsorbed substantially all of the same amount of Metanil Yellow dye (e.g., 5 mg) and substantially all of Metanil Yellow dye at twice the loading (e.g., 10 mg). As also shown in FIG. 2, half of the cationic adsorbent (0.50 g) adsorbed substantially all of the Metanil Yellow dye at twice the loading amount (e.g., 10 mg). These results indicate that the cationic modification of the composite filter aids may substantially increase the adsorption, and therefore filtration, of negatively charged impurities in the fluid being filtered.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cationic composite filter aid comprising:
    a silicate substrate, wherein the silicate substrate is selected from the group consisting of diatomite, perlite, pumice, volcanic ash, calcined kaolin, smectite, mica, talc, shirasu, obsidian, pitchstone, biogenic silica, and combinations thereof;
    a silica precipitated on the silicate substrate; and
    a cationic surface modification of the precipitated silica, the cationic surface modification comprising a cationic polymer;
    wherein the cationic surface modification comprises at least one coupling agent between the precipitated silica and the cationic polymer;
    wherein the at least one coupling agent comprises an isocyanato functional silane.

2. The cationic composite filter aid of claim 1, wherein the precipitated silica comprises magnesium silicate.

3. The cationic composite filter aid of claim 1, wherein the precipitated silica is in a range from about 5% to about 60% by weight of the cationic composite filter aid.

4. The cationic composite filter aid of claim 1, wherein the precipitated silica is in a range from about 1% to about 80% by weight of the cationic composite filter aid.

5. The cationic composite filter aid of claim 1, wherein the cationic composite filter aid has a permeability in a range from about 100 md to about 5000 md.

6. A method for making a cationic composite filter aid, the method comprising:
    providing a silicate substrate, wherein the silicate substrate is selected from the group consisting of diatomite, perlite, pumice, volcanic ash, calcined kaolin, smectite, mica, talc, shirasu, obsidian, pitchstone, biogenic silica, and combinations thereof;
    precipitating a silica onto the silicate substrate to form a composite filter aid;
    modifying the precipitated silica by a cationic surface modification to form the cationic composite filter aid;
    wherein the cationic surface modification comprises reacting at least one coupling agent with a cationic polymer;
    wherein the at least one coupling agent comprises an isocyanato functional silane.

* * * * *